US009860739B2

(12) United States Patent
Uglietti

(10) Patent No.: US 9,860,739 B2
(45) Date of Patent: Jan. 2, 2018

(54) SURVEILLANCE METHOD FOR A MOBILE TELECOMMUNICATIONS TERMINAL

(71) Applicant: SAFRAN IDENTITY & SECURITY, Issy les Moulineaux (FR)

(72) Inventor: Gianni Uglietti, Issy les Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/417,810

(22) Filed: Jan. 27, 2017

(65) Prior Publication Data
US 2017/0223524 A1    Aug. 3, 2017

(30) Foreign Application Priority Data

Jan. 29, 2016 (FR) ...................................... 16 50754

(51) Int. Cl.
*H04M 1/66* (2006.01)
*H04W 8/18* (2009.01)
(Continued)

(52) U.S. Cl.
CPC ............ *H04W 8/183* (2013.01); *G06F 21/77* (2013.01); *H04L 63/0853* (2013.01);
(Continued)

(58) Field of Classification Search
CPC ....... H04W 8/183; H04W 4/12; H04W 12/08; H04W 12/06; H04W 8/205; H04W 12/04;
(Continued)

(56) References Cited

U.S. PATENT DOCUMENTS

2010/0311402 A1* 12/2010 Srinivasan ............ H04W 8/183
455/418
2012/0190354 A1* 7/2012 Merrien ................ H04W 4/001
455/422.1
(Continued)

FOREIGN PATENT DOCUMENTS

DE      102010044687 A1    8/2012
EP          2756695 A1 *    7/2014
(Continued)

OTHER PUBLICATIONS

Embedded SIM Task Force Requirements and Use Cases; GSM Association; BNSDOCID: <XP_55180476A_I_>; Feb. 21, 2011; pp. 1-38; V1.0.

*Primary Examiner* — Mahendra Patel
(74) *Attorney, Agent, or Firm* — Muncy, Geissler, Olds & Lowe, P.C.

(57) ABSTRACT

A surveillance method for a mobile telecommunications terminal having an eSIM card. A plurality of subscription profiles are stored in the eSIM card. The surveillance method includes steps of incrementing a counter each time a change of subscription profile order is received, determining a number of change of subscription profile orders received during a predetermined duration, and, if the number of change of subscription profile orders received during the predetermined duration is greater than a predetermined threshold, deducing therefrom that operation is suspect.

17 Claims, 2 Drawing Sheets

(51) Int. Cl.
    H04M 1/725    (2006.01)
    H04W 4/12     (2009.01)
    H04W 12/08    (2009.01)
    G06F 21/77    (2013.01)
    H04L 29/06    (2006.01)
    H04W 12/06    (2009.01)
    H04W 88/06    (2009.01)

(52) U.S. Cl.
    CPC ......... *H04M 1/72522* (2013.01); *H04W 4/12* (2013.01); *H04W 12/06* (2013.01); *H04W 12/08* (2013.01); *H04W 88/06* (2013.01); *G06F 2221/2105* (2013.01)

(58) Field of Classification Search
    CPC .. H04M 1/72522; G06F 21/558; G06F 21/77; G06F 2221/2105; H04L 67/303; H04L 41/142; H04L 63/0853; H05B 1/3816
    USPC ......... 455/410, 411, 461, 435.1; 379/211.02; 709/225
    See application file for complete search history.

(56) References Cited

U.S. PATENT DOCUMENTS

| | | | |
|---|---|---|---|
| 2012/0315875 A1* | 12/2012 | Breuer | H04L 63/108 455/411 |
| 2013/0165073 A1* | 6/2013 | Madsen | H04W 12/06 455/411 |
| 2013/0174283 A1* | 7/2013 | Gibis | G06F 21/558 726/34 |
| 2013/0231087 A1* | 9/2013 | O'Leary | H04W 8/22 455/411 |
| 2013/0340059 A1* | 12/2013 | Christopher | H04W 12/04 726/7 |
| 2014/0038563 A1* | 2/2014 | O'Leary | H04W 8/22 455/411 |
| 2014/0237101 A1* | 8/2014 | Park | H04L 67/303 709/223 |
| 2014/0293824 A1* | 10/2014 | Castro Castro | H04L 41/142 370/252 |
| 2015/0271662 A1* | 9/2015 | Lhamon | H04W 8/183 370/329 |
| 2015/0289137 A1* | 10/2015 | Yang | H04B 1/3816 455/411 |
| 2015/0312527 A1* | 10/2015 | Ansiaux | H04N 7/181 348/143 |
| 2016/0165433 A1* | 6/2016 | Larignon | H04W 8/205 455/419 |

FOREIGN PATENT DOCUMENTS

FR        3021181 A1    11/2015
KR    20130027097 A  *  3/2013

* cited by examiner

SURVEILLANCE METHOD FOR A MOBILE TELECOMMUNICATIONS TERMINAL

The invention relates to the field of mobile telecommunications terminals having an eUICC or an eSIM card.

BACKGROUND OF THE INVENTION

The expected deployment of embedded universal integrated circuit cards (eUICCs), also known as embedded subscriber identity modules (eSIMs), for all types of mobile telecommunications terminal giving access to telephone networks (in particular mobile telephones, smartphones, tablets), implies various changes to the way in which users manage their subscriptions to services provided by telephone operators.

At present, when a user of a mobile telecommunications terminal selects a subscription to a service provided by a telephone operator, the user purchases a traditional SIM card and then inserts the traditional SIM card in the mobile telecommunications terminal in order to benefit from the service. When the user decides to change telephone operator, the old SIM card is removed and destroyed or discarded, and the user obtains a new SIM card.

In contrast, when a user of a mobile telecommunications terminal having an eSIM card selects a subscription to a service provided by a telephone operator, the user loads a subscription profile associated with the telephone operator, and then activates the subscription profile. When the user decides to change telephone operator, the user deactivates the active subscription profile and may delete it, and then loads and activates a new subscription profile. These operations are performed via a user interface of the mobile telecommunications terminal.

Thus, by means of the eSIM card, a user can load a plurality of subscription profiles for a plurality of different telephone operators, and can select to activate any one of the subscription profiles, and to change the currently active subscription profile for another one of the subscription profiles loaded in the eSIM card.

The use of eSIM cards presents a certain number of risks associated with the execution of malware applications in the mobile telecommunications terminal.

Thus, certain malware applications seek to exchange the active subscription profile for a new subscription profile, unbeknownst to the user.

Among the risks for the user of this type of malware application, there is in particular a risk of a large increase in subscription charges, in the event of the new subscription profile being associated with a much higher rate, and there is also a risk of service being denied. Under such circumstances, this risk of service denial involves executing an infinite loop of exchanging subscription profiles.

Among the risks for a telephone operator of this type of malware application, there is in particular a risk of "disintermediation", in the event of a malware application being capable, in real time, of taking the place of the user and selecting the subscription profile having the lowest cost from among the available subscription profiles. This leads to risks associated with problems of liability and of brand image, and also naturally leads to risks associated with losing clients and revenue.

OBJECT OF THE INVENTION

An object of the invention is to reduce the above-mentioned risks.

SUMMARY OF THE INVENTION

In order to achieve this object, the invention provides a surveillance method for a mobile telecommunications terminal having an integrated circuit of the eUICC or eSIM card type, a plurality of subscription profiles being stored in the integrated circuit, and the surveillance method comprising the following steps:
- incrementing a counter each time a change of subscription profile order is received;
- determining a number of change of subscription profile orders received during a predetermined duration; and
- if the number of change of subscription profile orders received during the predetermined duration is greater than a predetermined threshold, deducing therefrom that operation of the mobile telecommunications terminal is suspect.

The surveillance method of the invention thus deduces that operation is suspect from an excessive number of subscription profile change orders occurring during a predetermined duration. The surveillance method of the invention thus serves to detect the execution of a malware application that exchanges the active subscription profile of the mobile telecommunications terminal frequently and unbeknownst to a user of the mobile telecommunications terminal.

Other characteristics and advantages of the invention appear on reading the following description of a particular, non-limiting embodiment of the invention.

BRIEF DESCRIPTION OF THE DRAWINGS

Reference will be made to the appended drawings, wherein.

DETAILED DESCRIPTION OF THE INVENTION

Figure 1:
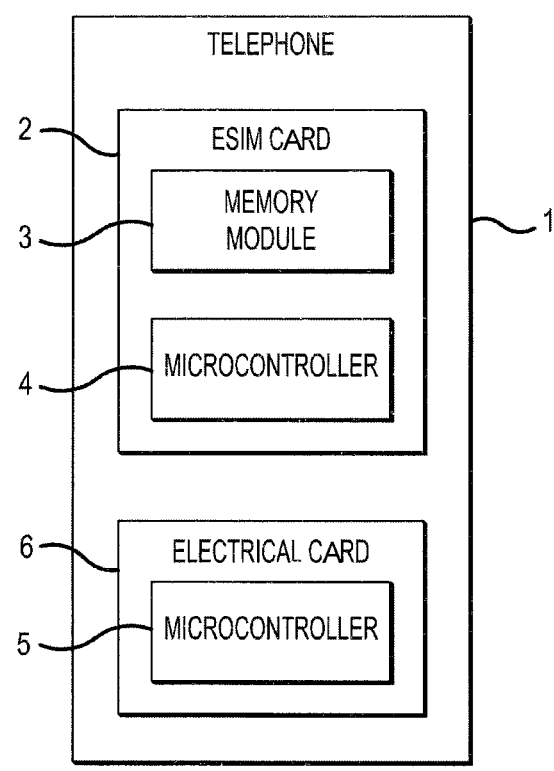
FIG. 1 schematically represents a mobile telephone.
Figure 2:
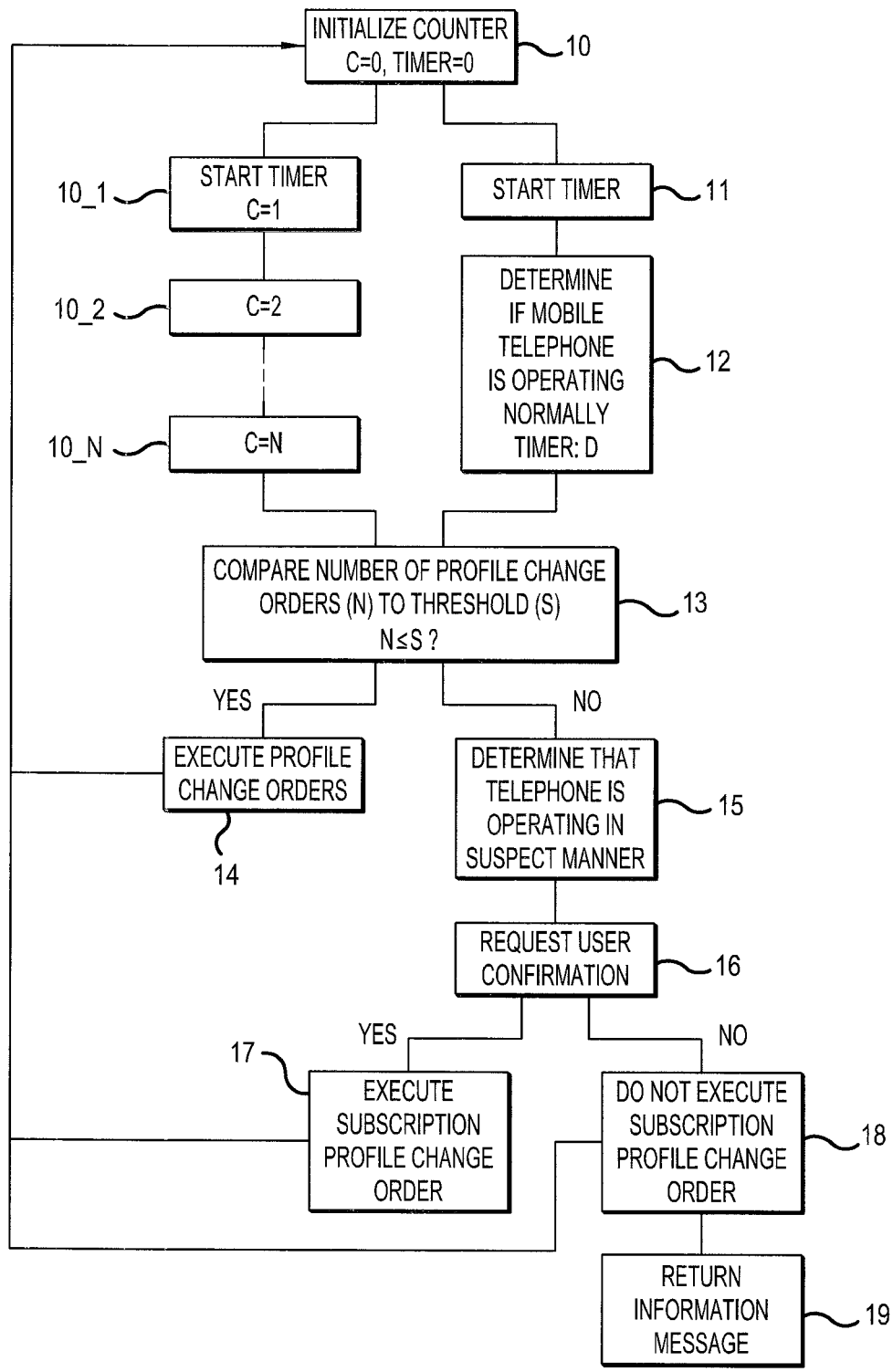
FIG. 2 represents the steps of the surveillance method of the invention.

The surveillance method of the invention is implemented in this example for surveillance of a mobile telephone 1 fitted with an eSIM card 2 positioned inside the mobile telephone.

The eSIM card 2 of the mobile telephone 1 comprises a memory module 3 and a microcontroller 4.

The memory module 3 of the eSIM card 2 comprises a read only memory (ROM), an electrically erasable programmable read only memory (EEPROM) or a flash memory, and a random access memory (RAM). A plurality of subscription profiles corresponding to a plurality of different telephone operators and all associated with a user of the mobile telephone are loaded and stored in the memory module of the eSIM card.

The microcontroller 4 of the eSIM card 2 runs the surveillance method of the invention by executing a program of the operating system of the eSIM card 2. The program is stored in the memory module 3 of the eSIM card 2.

A counter C is executed by the microcontroller 4 of the eSIM card 2. The counter C is initialized on zero during initialization of the eSIM card (step 10). Thereafter, each time the microcontroller of the eSIM card receives an order to change the subscription profile, the counter is incremented.

When a first change of subscription profile order is received after the eSIM card has been initialized, a timer dedicated to implementing the surveillance method of the invention is started (step 10.1, step 11).

The timer is embodied in the form of a timer included in a microcontroller 5 of an electrical card 6 of the mobile telephone 1. The electrical card 6 is distinct from the eSIM card 2. The timer is controlled by the microcontroller of the eSIM card by means of a set of commands that are programmed and stored in the memory module 3 of the eSIM card 2. The set of program commands serves in particular to provide an interface between the eSIM card 2 and the distinct electrical card, and enables the eSIM card 2 to control the distinct electrical card in order to implement a predefined set of functions (including control of the timer). The set of commands programmed in the eSIM card 2 forms a SIM application toolkit (STK).

Once it has started, the timer measures a certain predetermined duration. During the predetermined duration, the eSIM card makes use of the counter to determine the number of subscription profile change orders it receives (including the first subscription profile change order; steps 10_1 to 10_N).

At the end of the predetermined duration (step 12), if the number of subscription profile change orders received during the predetermined duration is less than or equal to a predetermined threshold, the eSIM card considers that the mobile telephone is operating normally. Subscription profile change orders are executed by the eSIM card (steps 13 and 14). The counter and the timer are reinitialized.

At the end of the predetermined duration (step 12), if the number of change of subscription profile orders received during the predetermined duration is greater than the predetermined threshold, then the eSIM card deduces from the number of subscription profile change orders that the mobile telephone is operating in suspect manner (steps 13 and 15).

The change of subscription profile change order following detection of suspect operation is not executed immediately.

The eSIM card causes a pop-up window to be displayed on a screen of the mobile telephone, sending a warning message to the user of the mobile telephone. In particular, the warning message requires confirmation from the user prior to executing the subscription profile change order after detecting suspect operation (step 16).

If the user confirms that this change of subscription profile order was indeed issued voluntarily by the subscriber in person, then the change of subscription profile change order is executed and the counter and the timer are reinitialized (step 17).

Otherwise, the change of subscription profile order is not executed (step 18). The counter and the timer are reinitialized.

Advantageously, the eSIM card then causes an action to be performed from amongst the following actions: totally or partially deactivating the mobile telephone; deleting the malware application; displaying recommendations to the user for correcting the suspect operation; and returning an information message to one or more telephone operators (step 19).

It should be observed that both the predetermined duration during which the number of change of subscription profile orders is determined in order to detect suspect operation of the mobile telephone, and also the predetermined threshold with which the number of subscription profile change orders is compared, can themselves be configured by the user of the mobile telephone. This thus makes the detection of suspect operation flexible so that it can be adapted by the user to the way a user makes use of the mobile telephone and manages a plurality of subscriptions.

The invention is not limited to the above-described particular implementation, but on the contrary covers any variant coming within the ambit of the invention as defined by the claims.

It is stated above that the surveillance method of the invention is controlled by executing a program of the operating system of the eSIM card. However, this program may alternatively be included in an "applet" executed by the microcontroller of the eSIM card.

In this example, the eSIM card is embedded or integrated in a mobile telephone. Nevertheless, the invention naturally applies to other mobile telecommunications terminals: a tablet, a smartphone, a connected watch, etc.

The invention also naturally applies to any type of removable or non-removable integrated circuit other than a circuit of the eUICC type, and not only to eSIM cards (e.g. to non-removable and embedded USIM type cards).

The invention claimed is:

1. A surveillance method for a mobile telecommunications terminal having an integrated circuit of the eUICC or eSIM card type, a plurality of subscription profiles being stored in the integrated circuit, and the surveillance method comprising the following steps:
   incrementing a counter each time a change of subscription profile order is received
   determining a number of change of subscription profile orders received during a predetermined duration;
   if the number of change of subscription profile orders received during the predetermined duration is greater than a predetermined threshold, deducing therefrom that operation of the mobile telecommunications terminal is suspect,
   sending a warning message to a user of the mobile telecommunications terminal when suspect operation of the mobile telecommunications terminal is deduced from the number of change of subscription profile orders that have been received,
   wherein the warning message requires confirmation from the user prior to executing a change of subscription profile order following detection of suspect operation,
   wherein the counter is executed in the integrated circuit of the eUICC or eSIM card type maintains an incrementing count of clock ticks that took place after the last swap event,
   wherein the determined duration is measured by a timer, and
   wherein the timer is implemented in an electrical card of the mobile telecommunications terminal, the electrical card being distinct from the eUICC or eSIM card type.

2. The surveillance method according to claim 1, wherein the warning message is sent via a pop-up window that is displayed on a screen of the mobile telecommunications terminal.

3. The surveillance method according to claim 1, further comprising the step of reinitializing the counter when the warning message has been sent.

4. The surveillance method according to claim 1, wherein the predetermined duration and the predetermined threshold are configurable.

5. The surveillance method according to claim 1, wherein the surveillance method is controlled by the integrated circuit.

6. The surveillance method according to claim 5, wherein the counter is implemented in the integrated circuit.

7. The surveillance method according to claim 5, wherein the determined duration is measured by a timer implemented in the mobile telecommunications terminal and controlled by the integrated circuit by means of a tool of the SIM application toolkit (STK) type.

8. A system for surveillance of a mobile telecommunications terminal having an integrated circuit of the eUICC or eSIM card type, a plurality of subscription profiles being stored in the integrated circuit, the system comprising:
- a counter configured to be incremented each time a change of subscription profile order is received and to determine a number of change of subscription profile orders received during a predetermined duration,
- wherein if the number of change of subscription profile orders received during the predetermined duration is greater than a predetermined threshold, deducing therefrom that operation of the mobile telecommunications terminal is suspect,
- wherein a warning message is sent to a user of the mobile telecommunications terminal when suspect operation of the mobile telecommunications terminal is deduced from the number of change of subscription profile orders that have been received,
- wherein the warning message requires confirmation from the user prior to executing a change of subscription profile order following detection of suspect operation, and
- wherein the integrated circuit of the eUICC or eSIM card type maintains an incrementing count of clock ticks that took place after the last swap event.

9. The surveillance method according to claim 8, wherein the warning message is sent via a pop-up window that is displayed on a screen of the mobile telecommunications terminal.

10. The surveillance method according to claim 8, further comprising the step of reinitializing the counter when the warning message has been sent.

11. The surveillance method according to claim 8, wherein the predetermined duration and the predetermined threshold are configurable.

12. The surveillance method according to claim 8, wherein the surveillance method is controlled by the integrated circuit.

13. The surveillance method according to claim 12, wherein the counter is implemented in the integrated circuit.

14. The surveillance method according to claim 12, wherein the determined duration is measured by a timer implemented in the mobile telecommunications terminal and controlled by the integrated circuit by means of a tool of the SIM application toolkit (STK) type.

15. The surveillance method according to claim 10, wherein when the clock exceeds a minimum threshold, the integrated circuit of the eUICC or eSIM card type can perform a swap, otherwise the swap is ignored or postponed.

16. A surveillance method for a mobile telecommunications terminal having an integrated circuit of the eUICC or eSIM card type, a plurality of subscription profiles being stored in the integrated circuit, and the surveillance method comprising the following steps:
- incrementing a counter each time a change of subscription profile order is received
- determining a number of change of subscription profile orders received during a predetermined duration;
- if the number of change of subscription profile orders received during the predetermined duration is greater than a predetermined threshold, deducing therefrom that operation of the mobile telecommunications terminal is suspect,
- sending a warning message to a user of the mobile telecommunications terminal when suspect operation of the mobile telecommunications terminal is deduced from the number of change of subscription profile orders that have been received,
- wherein the warning message requires confirmation from the user prior to executing a change of subscription profile order following detection of suspect operation, and
- wherein the integrated circuit of the eUICC or eSIM card type maintains an incrementing count of clock ticks that took place after the last swap event.

17. The surveillance method according to claim 16, wherein when the clock exceeds a minimum threshold, the integrated circuit of the eUICC or eSIM card type can perform a swap, otherwise the swap is ignored or postponed.

* * * * *